United States Patent
Bramley

[11] 3,713,761
[45] Jan. 30, 1973

[54] MANUFACTURE OF NETTING
[76] Inventor: Anthony Bramley, Gosford House, Gosford, Kidlington, England
[22] Filed: Aug. 5, 1970
[21] Appl. No.: 61,315

[52] U.S. Cl. .................................. 425/109, 140/10
[51] Int. Cl. ............................................. B28b 19/00
[58] Field of Search............. 18/30 PP, 30 PM, 30 PT, 30 UM; 140/10, 11, 12, 13, 14, 15; 425/109

[56] References Cited

UNITED STATES PATENTS

| 3,340,570 | 9/1967 | Korf | 18/30 UM X |
| 1,075,374 | 10/1913 | Parrish | 140/15 X |
| 3,084,720 | 4/1963 | Yaeger | 140/10 X |

Primary Examiner—H. A. Kilby, Jr.
Attorney—Woodhams, Blanchard and Flynn

[57] ABSTRACT

The invention provides an improved apparatus for producing recilinear mesh netting from threads containing thermoplastic material. In manufacturing netting in accordance with the invention transverse threads are drawn across parallel longitudinal threads and discrete masses of thermoplastic material in heated condition are moulded in respective dies about the thread crossings. The path of each transverse thread between the dies is extended by an amount corresponding to the contraction of the transverse thread which occurs in the moulding operation. The apparatus is preferably fitted with adjustable thread diverter elements between each die so that the extent to which the transverse thread deviates can be varied to correspond with the shrinkage incurred in each particular case, depending on the nature of the threads employed and on the number of longitudinal threads or the mesh size. Netting produced in accordance with the invention can be used for a variety of purposes for example in sports or for fishing and when electrically conductive threads are employed the netting can be used for electrified agricultural fencing.

9 Claims, 4 Drawing Figures

MANUFACTURE OF NETTING

The present invention relates to the manufacture of netting.

In U.S. Pat. No. 3,501,366 there is described and claimed netting which is composed of regularly and preferably rectilinearly arranged flexible threads which consist of or contain thermoplastic filaments, the threads being joined to one another to form netting by masses of plastics material individually moulded and bonded to each thread at each thread junction. The netting can be made by drawing transverse threads comprising thermoplastic material across longitudinal threads also comprising thermoplastic material and moulding discrete masses of thermoplastic material in a heated condition about the threads at crossing points.

Such netting can be manufactured in apparatus which includes means for advancing a plurality of longitudinal threads, means for drawing at least one transverse thread across the longitudinal threads, a plurality of operable die assemblies each adapted to receive and enclose portions of one longitudinal and one transverse thread at a thread crossing, and means for introducing heated plastics material into the die assemblies to form a moulded mass therein. The die assemblies may be provided in a multiple moulding head extending across the width of the net-making machine, and may be openable simultaneously between moulding operations to permit intermittent advance of the netting being produced.

It has been found in the practical operation of this method of producing netting that the hot moulding of the plastics masses leads to a contraction of transverse thermoplastic threads of the order of 0.010 inch per moulded mass. In the manufacture of coarse mesh netting, for example for fencing purposes, this contraction is of little account, but where a relatively large number of thread junctions occur across the width of the netting, as in the case of sports or fish netting, the shrinkage which occurs can give rise to difficulties. Not only is the width of the netting produced less than that expected from the dimensions of the moulding head, but problems arise from the deviation of the longitudinal threads which occurs as they pass the line of dies. The problem is particularly acute where moulding heads are employed which apply two or more rows of moulded masses simultaneously.

Attempts to offset the shrinkage in the transverse direction by spacing the dies more widely than the desired spacing of the thread junctions, by the amount necessary to compensate for the shrinkage, have not provided a satisfactory solution to the problem because they do not avoid the difficulty of non-rectilinear advance of the longitudinal threads through the moulding dies.

It has now been found that this problem can be solved by providing thread diverting means arranged to extend the path of a transverse thread between the two adjacent dies to an extent corresponding to the contraction occurring between the die centers. In the preferred apparatus, thread diverting elements are provided for this purpose between each individual die in operation.

The diverting elements may be fixed and may, for example, be in the form of convex surface provided on the structure between the dies across which the transverse thread passes, but it is preferable that they should be adjustable, so that allowance can be made for different properties of different types of thread that may be used. Moreover, the use of adjustable elements makes it possible to employ the principle of the present invention in universal net-making machines, in which the number of dies actually in use at a given time, and hence their spacing, can be varied by selectively shutting off those dies not required for the type of netting to be made. In such a case, the diverting elements can be selectively adjusted to ensure that the correct compensation for shrinkage occurs between each die in use. Adjustable elements may be mounted on screw threads and have heads formed with several intersecting guide grooves. Depending on the number of intersecting guide grooves in the head of the element, the increment of adjustment will be the corresponding fraction of the pitch of the thread on which the element is mounted.

The diverting element should have a surface which provides a smooth path for the thread, for example a convexly arcuate path. It is preferred that the element should be provided with a groove or guideway to guide the transverse thread and to maintain it in the path which ensures the desired length of deviation. Guides may also be provided in or adjacent to the dies to ensure that not only the transverse but also the longitudinal threads are accurately located within the dies for the moulding operation.

The apparatus of this invention is useful for making all types of netting from threads or twines containing thermoplastic material. The twines may be wholly of plastics material, as for example in the case of sports or fish netting, or may include metal filaments as in the case of netting for electrified fences. With a given machine having a standard spacing of dies across the width of the machine, the mesh size can be varied in multiples of the standard spacing by varying the number of longitudinal threads employed, the unwanted dies or injectors being disconnected. In such a case the diverter elements will not all necessarily be adjusted to an identical vertical position but are adjusted to compensate for the shrinkage actually incurred in each mesh.

In accordance with another aspect of this invention it has been found that a more regular result is achieved if the transverse threads, on being drawn through the open dies and cut, are only loosely held at their opposite ends as the dies close so that the ends can be drawn in as the threads are enclosed in the dies and local or unequal tension on the threads is avoided.

This feature is of general application in machines for making netting by the application of moulded masses to thread crossings, but is of particular value when thread diverting elements are also employed because the diversion or displacement of the transverse threads between adjacent dies would give rise to more serious tension problems in the absence of this further feature.

In the apparatus of this invention, the loose control of the ends of the transverse threads can be provided for by upper and lower gripper elements respectively associated with upper and lower die portions and disposed in pairs at the ends of the row of die assemblies, the gripper elements being arranged to close as the dies move to the closed position and to reach and remain in a position where they loosely grip a transverse thread before the dies are completely closed. The upper gripper elements may be fixed to or with respect to the upper die portion structure and the lower gripper elements movable with but independently of the lower die portions.

In a particularly advantageous construction, the outer lateral faces of the upper and lower gripper elements in respective pairs are coplanar and a respective cutter blade is mounted in sliding contact with the outer face of each upper gripper element. When the gripper elements close to loosely grip a transverse thread the cutter blades are advanced across the outer faces of the pairs of gripper elements to sever the thread at both ends at the faces of the gripper elements.

The invention will be further described by way of example by reference to one embodiment thereof, which is illustrated in the accompanying drawings.

Figure 1:
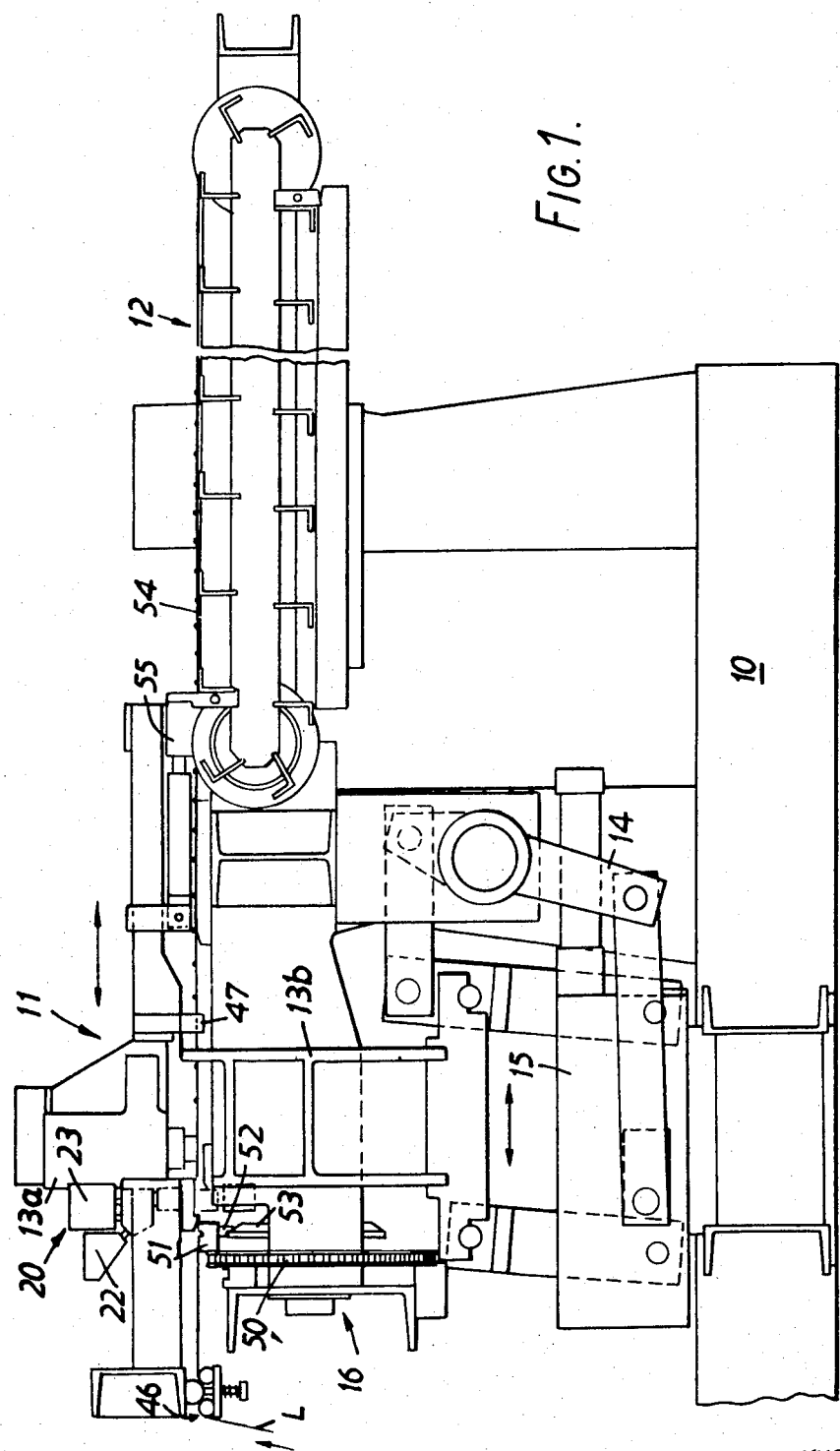
FIG. 1 is a side elevation of a net-making machine according to this invention.

In the machine shown in the drawings a base 10 carries a net-making unit 11 and a take-off unit 12. The net-making unit includes a longitudinally reciprocable carriage having upper and lower portions 13a and 13b which are moved together as shown by the arrows in FIG. 1 by a lever mechanism 14 actuated by a hydraulic system 15, which may be constructed in accordance with conventional principles and for the sake of clarity is not shown in detail. A transverse thread or weft drawing device indicated generally at 16 is also driven hydraulically.

Figure 2:
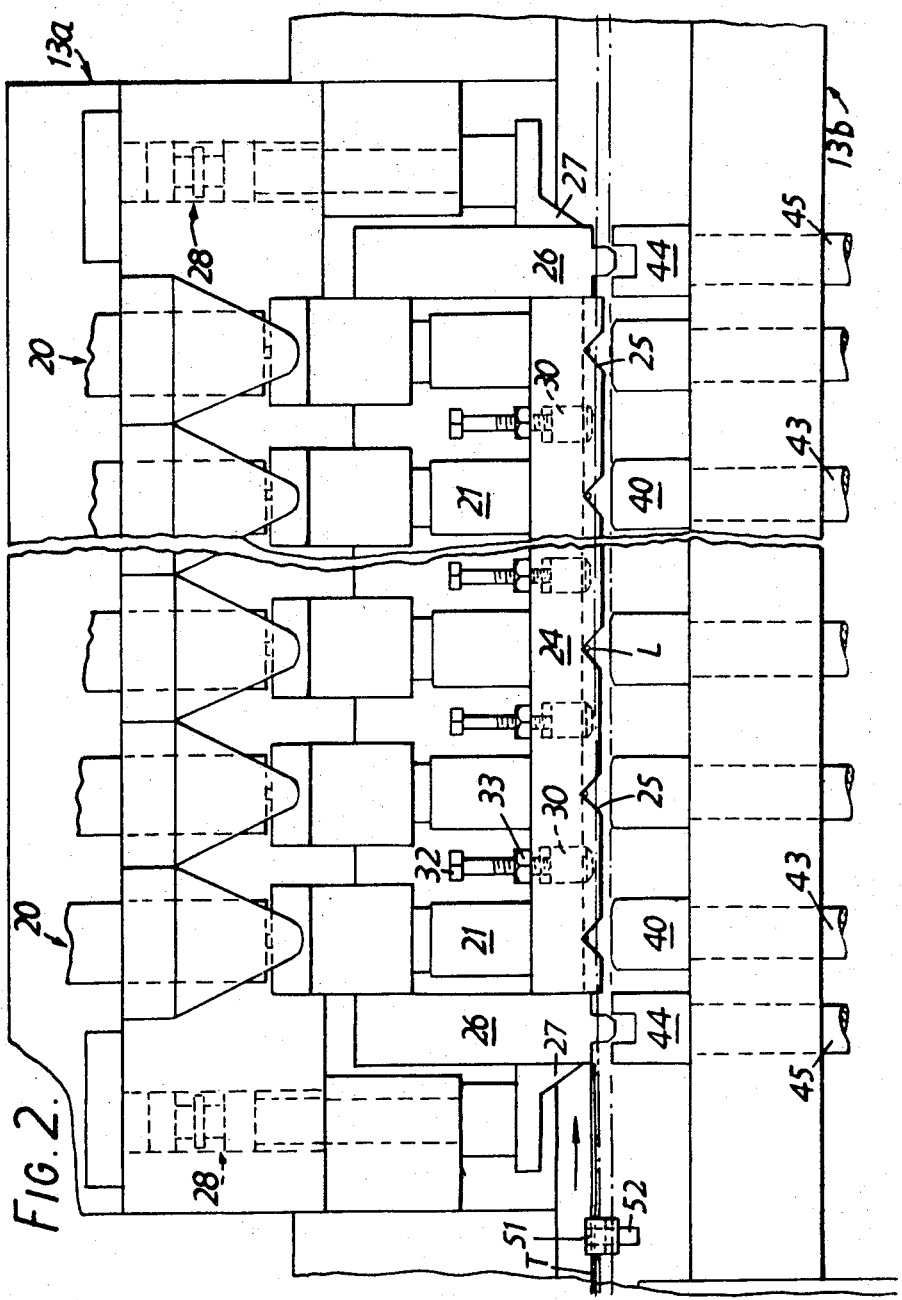
FIG. 2 is a partial end elevation of the die assemblies and associated structure in the machine shown in FIG. 1.
Figure 3:
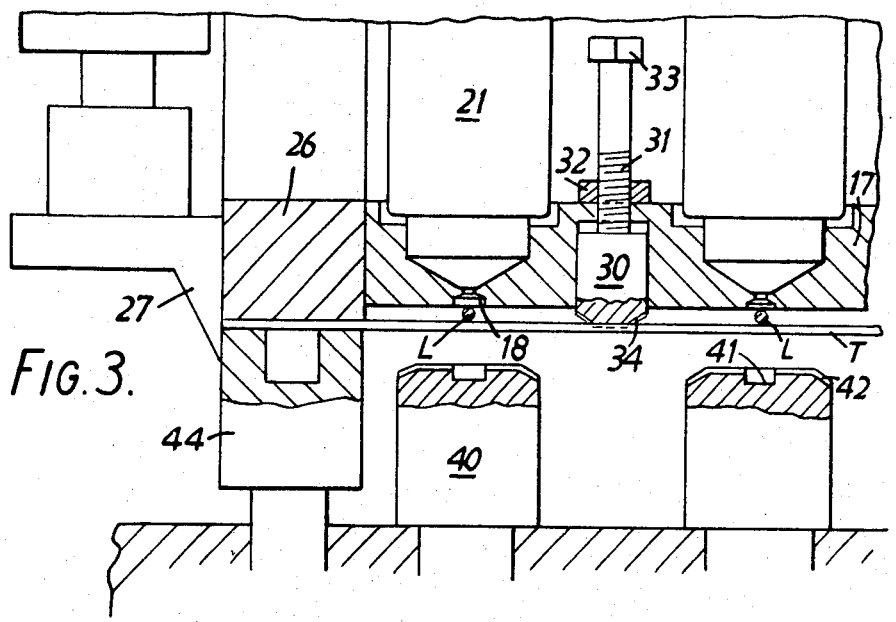
FIGS. 3 and 4 are partial cross-sections of the die assemblies and associated structure shown in FIG. 2, showing two stages in the cycle of operation of the machine.
Figure 4:
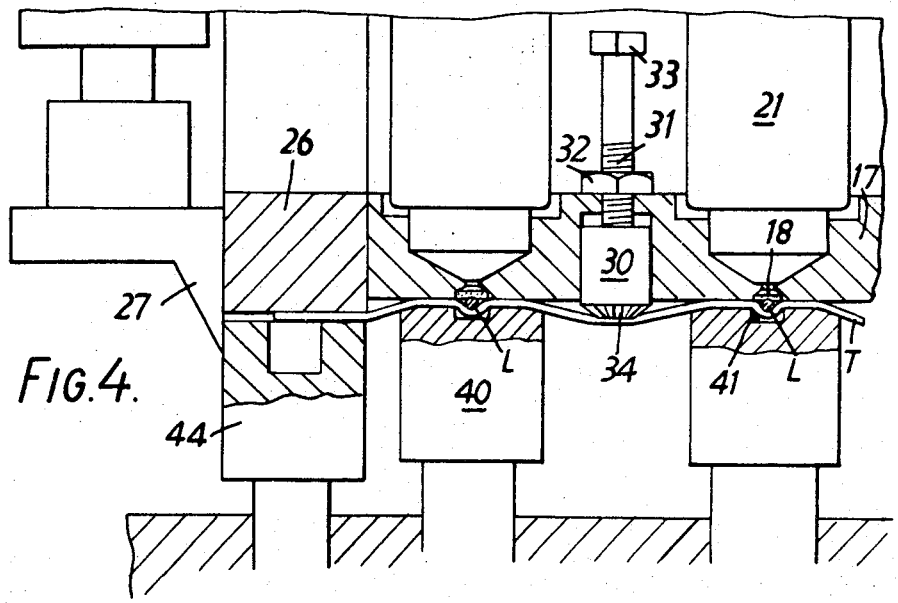

The upper portion 13a of the carriage carries a transverse bar 17, best seen in FIGS. 2 to 4, in which is formed a row of upper moulding die cavities 18. The cavities are in communication with the outlet nozzles of individual moulding injectors 20 provided for each thread crossing. The injectors each include a heated barrel 21, a feed hopper 22 for granular thermoplastic and hydraulic mechanism 23 for actuating a piston in the barrel. They may be constructed in accordance with conventional principles and are not concerned in the present invention. The bar 17 also carries a guide plate 24 which extends downwardly in advance of the moulding dies and is formed with V-shaped guideways 25 to locate the longitudinal or warp threads accurately in relation to the dies.

In accordance with the invention, alongside the two outermost dies at the ends of the bar 17 are two respective upper gripper elements 26 having plane outer faces, and beyond the gripper elements are respective cutter blades 27 which are reciprocable vertically by hydraulic mechanism indicated generally at 28.

In accordance with the invention also, there are located in the bar 17 between the die cavities 18 thread diverting elements 30. These elements lie on the line of centers of the die cavities and are retained in the bar 17 by screw threads 31 by which their vertical position is also adjustable. Polygonal heads 32 facilitate adjustment of the elements and lock nuts 33 ensure that the selected position is maintained. The projecting ends or noses of the elements 30 are formed with a number of intersecting radial grooves 34 which serve to guide a transverse thread passing across the noses of the elements. The provision of a number of such grooves permits adjustment of the vertical position of the elements to a fraction of the pitch of the mounting threads 31. Alternative forms of diverter element and alternative mountings may be used, bearing in mind that it is preferable that the element should provide a guideway for the weft thread and the mounting should permit vertical adjustment.

The lower portion 13b of the carriage bears a transverse row of lower moulding die portions 40 with cavities 41 corresponding to the upper die cavities 18. The die portions are formed with grooves 42 to accommodate the warp and weft threads which will pass through the dies. The lower die portions are carried on shafts 43 by means of which they can be raised by hydraulic mechanism (which can be of conventional type and is not shown) to close the dies.

In accordance with this invention, two lower gripper elements 44 are disposed at the ends of the row of lower die portions 40 and are carried by shafts 45 by means of which they can be raised by hydraulic mechanism (not shown). The hydraulic drive for these elements is arranged to raise the elements immediately before closure of the dies but only to a position in relation to the upper gripper elements 26 where a weft thread passing between the elements will be lightly gripped.

The carriage is also provided with front grippers 46 (see FIG. 1) in the form of one upper and two cooperating lower members between which the warp threads entering the machine can be gripped. Similar rear grippers are provided at 47 to grip the newly formed netting. A further pair of front and rear grippers are mounted on the fixed frame of the machine but are not shown in FIG. 1 in order not to obscure the drawing with unnecessary detail.

The weft drawing device 16, which is hydraulically powered, includes a transversely extending endless chain 50 passing over end sprockets and carrying weft thread grippers 51, one of which is shown in FIG. 2. The jaws of the weft thread grippers are opened and closed by levers 52 actuated by cam plates 53 in a manner already known in the textile arts and the grippers are carried by the upper reach of the chain 50 across the machine along a line which will intersect the axes of the die assemblies when the latter reach their closing position.

The take off unit 12 is in the form of a chain conveyor 54 adapted to support the mesh structure of the netting produced by the net-making unit 11 and deliver it in a regular and controlled manner. The conveyor is driven intermittently in time with the moulding cycle of the net-making unit, for example by a rack mechanism located at 55.

In operation, warp threads L consisting of or containing thermoplastic fibers or filaments, for example of polyethylene, are drawn from a bank of cheeses or other supply, passed through the front grippers 46, between the die portions and through the rear grippers 47, and also through the grippers (not shown) on the fixed part of the machine. A weft thread T is drawn from a cheese or other supply of a similar thread, also including a thermoplastic, and preferably the same thermoplastic as the warp threads. The diverter elements 30 are each adjusted to compensate for the shrinkage previously observed to occur when the threads are bonded together during injection moulding.

In a single cycle of operation, the weft draw chain 50 is moved intermittently to carry the gripper 51 shown in FIG. 2 across the machine in the direction of the arrow. The jaws of the gripper are at this time closed and a fresh length of the weft thread T is drawn across the machine in the position which the dies will take up for moulding. At this time the carriage is retracted and the upper and lower die portions move apart to release the previous bonded weft thread. As the gripper 51 reaches the opposite side of the machine the next gripper comes into position to take up a further length of thread T for the next weft insertion. At this time the carriage with the dies open is moved to its front position, that is, at the extreme left hand end of its travel as seen in FIG. 1, and the grippers 46 and 47 are closed, clamping the warp threads L in relation to the carriage. The upper portion 13a of the carriage carrying the upper die cavities 18 is then lowered, together with the upper gripper elements 26 and the cutter blades 27.

The lower gripper elements 44 are then raised into engagement with the corresponding upper elements and at the same time the cutter blades 27 are lowered across the outer face of the gripper elements 26 and 44. FIG. 3 shows the position of the essential parts of the machine at this stage, where the weft thread T is loosely gripped between the gripper elements 26 and 44 and the blade 27 has severed the inserted weft thread from the supply. The gripper elements 44 then remain stationary while the lower die portions 40 are raised to enclose the weft and warp threads T and L in the die cavities 18, 41. As the dies close the weft thread suffers minor deviation where it crosses the warps in the cavities but a more extensive deviation over the diverter elements 30 and the ends of the thread T are drawn in between the gripper elements 26 and 44 to permit such deviation, as shown in FIG. 4, substantially without tension in the thread T.

The injectors 20 then inject heated thermoplastic, which may be of the same chemical type as the thermoplastic material of the threads, into the die cavities to form moulded masses therein which bond the weft thread to each warp thread. The carriage, with the warps still clamped to it, moves to its rear position, that is to the right as seen in FIG. 1 and carries the warps with the bonded weft for a distance equal to the mesh dimension of the netting. When the carriage has reached its rear position, the front and rear grippers on the fixed part of the machine close to clamp the warps and netting in the new position and the front and rear grippers 46 and 47 on the carriage release the warps. The dies and the gripper elements 26 and 44 then reopen and the carriage is free to return to its front position for the beginning of a fresh cycle.

I claim:

1. Apparatus for producing netting comprising:
   means for advancing a plurality of longitudinal threads;
   means for drawing at least one transverse thread across the longitudinal threads;
   a transverse row of openable die assemblies each adapted to receive and enclose portions of one longitudinal and one transverse thread at a thread crossing;
   means for introducing a heated plastics material into the die assemblies to form a moulded mass therein;
   and thread diverting means disposed between adjacent die assemblies to extend the path of a transverse thread between said die assemblies to counteract the contraction of the transverse thread which occurs on the introduction of the heated plastics material.

2. Apparatus according to claim 1 in which said diverting means comprise thread diverting elements located between each individual die assembly.

3. Apparatus according to claim 2 in which the thread diverting elements are adjustable.

4. Apparatus according to claim 2 in which each thread diverting element is provided with a guideway to receive and guide a transverse thread.

5. Apparatus according to claim 3 in which the thread diverting elements are mounted on screw threads.

6. Apparatus according to claim 1 in which at least some of the die assemblies are selectively operable whereby the apparatus can be used to produce netting with different numbers of longitudinal threads.

7. Apparatus according to claim 1 in which more than one transversely extending row of die assemblies is provided, whereby more than one transverse thread can be bonded to the longitudinal threads in a single cycle of operation.

8. Apparatus according to claim 1 including gripper elements at opposite ends of the row of die assemblies and adapted to loosely grip the opposite ends of a transverse thread whereby diversion of the thread is accomplished substantially without tension in the transverse thread.

9. Apparatus according to claim 8 including cutters disposed against the outer lateral faces of the gripper elements and movable to sever the transverse thread prior to closure of the die assemblies.

* * * * *